United States Patent [19]

Ishida et al.

[11] Patent Number: 4,973,829

[45] Date of Patent: Nov. 27, 1990

[54] BAR CODE READING METHOD

[75] Inventors: Yoshitaka Ishida; Masaki Izumi, both of Tokyo, Japan

[73] Assignee: Eastman Kodak Company, Rochester, N.Y.

[21] Appl. No.: 330,520

[22] Filed: Mar. 30, 1989

[30] Foreign Application Priority Data

Nov. 22, 1988 [JP] Japan ................................ 63-295807

[51] Int. Cl.⁵ .............................................. G06K 7/10
[52] U.S. Cl. .................................... 235/462; 235/463; 235/467
[58] Field of Search ................ 235/462, 463, 467, 472

[56] References Cited

U.S. PATENT DOCUMENTS

4,488,678 12/1984 Hara ..................................... 235/462

Primary Examiner—Harold I. Pitts
Attorney, Agent, or Firm—Raymond L. Owens

[57] ABSTRACT

A method of reading bar codes which enables incomplete readings of bar code data produced by excessive misalignment between the bar code and the bar code scanning line to be assembled automatically into a complete reading of the bar code data. This is done by combining incomplete data obtained by multiple passes of the read scanner, using a superimposition technique.

2 Claims, 6 Drawing Sheets

BAR CODE READING METHOD

BACKGROUND OF THE INVENTION

1. Field of the Invention

The present invention relates to a method of reading bar codes.

2. Description of the Prior Art

Bar codes in which ID (identification) data are encoded in binary form are used extensively, in most cases attached to an object as black and white binary data corresponding to a merchandise code or the like. These bar codes enable quantities of information to be encoded as combinations of black and white bars which are read by a dedicated scanner.

Thus, such bar codes enable desired ID data to be attached to an object in a form that can be readily decoded and read out as signals that can be processed electrically to provide information such as the content and price. Bar codes can also be utilized for price accounting when the merchandise is sold, and also for inventory control.

In addition to their general use in supplying goods for market distribution, such bar codes are also used extensively in manufacturing for parts control, keeping track of design drawings and, on the clerical side, for controlling accounting chits, for example.

In recent years, bar code readers are being employed that are not restricted to reading simple black and white binary bar codes, but also have multi-tone scanning capabilities that can provide better read precision. In addition to reading bar codes, such multi-tone bar code readers are also capable of reading the contents of drawings and chits; that is, they have OCR (optical character recognition) capabilities hat enable them to recognize shapes and alphanumeric characters, which greatly expand the range of possible applications.

Such a multi-tone OCR reader can be used in combination with a microfilmer. Such a combination converts a scanned drawing or chit to a microfilm in real time while at the same time reading a bar code affixed to the drawing or chit and storing the information as an index identifying the microfilm for search operations.

When an operator reads a bar code manually by pressing a bar code reader against the bar code or by sweeping the reader across the bar code, it is relatively easy for the bar code reader to scan the bar code correctly. However, when a bar code is to be read automatically, a bar code that has not been attached in the correct position on the object can cause a large slope to be produced between the direction in which the bar code is aligned and the direction of the scanning, making it impossible to obtain a correct reading of the data.

Usually bar codes are made relatively wide so that even when such a slope does exist, a complete data reading, that is, one in which the data thus read includes both a start mark and a stop mark, can be obtained with a single sweep of an automatic scanner. If the slope is particularly large, however, the result even of multiple sweeps of the scanner across the width of the bar code can be that none of the sweeps accomplishes a read of the complete data. In such cases, if the bar code cannot be decoded, it can lead to a shut-down of the system.

Especially when a bar code is being decoded automatically by moving the object in a z direction while the bar code is being scanned at right-angles thereto in an x direction, the sequential movement of the bar code along z can carry it beyond the x line of the scanning, again making it impossible to obtain a complete reading of the data.

In the prior art, recovery of the data in such cases has entailed a troublesome procedure usually requiring manual re-entry of the data, such as via a keyboard, for example, which causes problems in fully automated bar code systems.

SUMMARY OF THE INVENTION

In view of the problems with conventional bar code reading methods as mentioned above, the object of the present invention is to provide an improved bar code reading method in which even when a bar code has a large slope relative to the bar code scanning line, a multiplicity of incomplete data reads can be assembled automatically into complete data form by means of an automatic correction operation.

To attain the above object, with the bar code reading method according to the present invention, when a multiplicity of read scans of a bar code is performed and the data form each of the individual scans is incomplete, data obtained from each of the multiple read scans is assembled into a complete form. The incomplete data from each scan is stored once in a master memory and the data read in each of the succeeding scans is stored in a separate transaction memory, and the data in the two memories is reassembled as composite data.

That is, in accordance with the present invention, when the bar code data sequentially read in from each scanning sweep of the scanner across the bar code is complete, the said data is sent on without modification to be decoded, printed and so forth. When the data read in thus is incomplete data, i.e., data which does not include both a start mark and a stop mark, it is stored once in a master memory and the data read sequentially in each of the succeeding scans is stored in a transaction memory.

The incomplete data in the master memory and the data in the transaction memory are then compared, identical portions are superimposed and the data is then stored in the master memory as composite data. The length of the data portions to be regarded as coincident, that is, the data quantity, may be set as required.

Each of the steps or processes is repeated until the composite data in the composite data storage process becomes complete data that includes both a start mark and a stop mark, at which point the reading of the bar code is finished.

Further features of the invention, its nature and various advantages will be more apparent from the accompanying drawings and the following detailed descriptions of the invention.

DETAILED DESCRIPTION OF THE INVENTION

Figure 1:
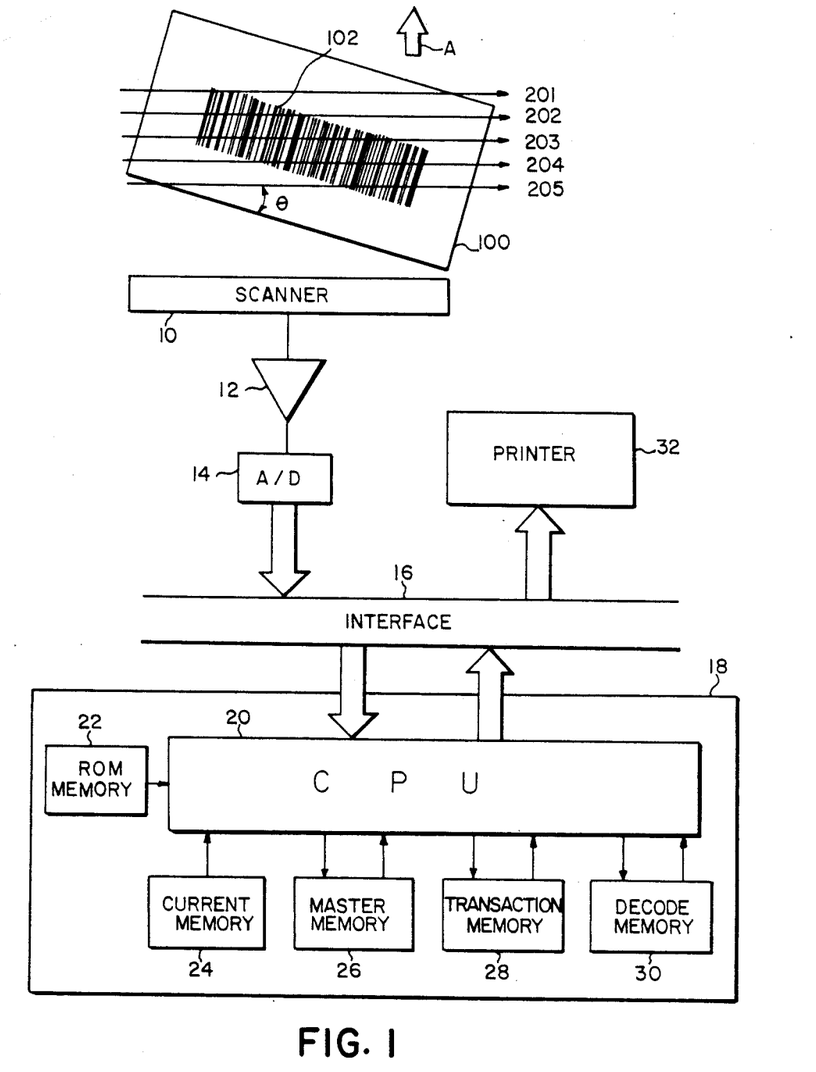
FIG. 1 is a schematic view of the overall arrangement of a bar code reader employing the bar code reading method according to the present invention.

FIG. 1 shows the overall arrangement of a bar code reader employing the bar code reading method according to the present invention. In this embodiment an object 100 is an office accounting chit, for example, that has a bar code 102. The bar code 102 is read by a scanner 10 which is constituted, for example, by a CCD line sensor and is able to read sequentially black and white bar codes.

In FIG. 1 the bar code 102 has a slope h with respect to the direction of scanning by the scanner 10 so, as explained below, with a complete read of the data being unobtainable with one sweep of the scanner, the bar code 102 cannot be decoded using normal methods.

As is well known, to read a bar code automatically, when the relative movement of the object 100 and the scanner 10 is in the direction indicated by the arrow A, a sequence of multiple read scans can be performed until the whole data decoding is completed.

Figure 2:
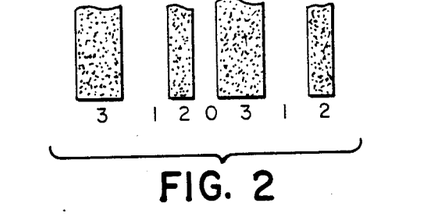
FIG. 2 is an explanatory drawing showing an example of the bar code of FIG. 1 and the corresponding read signals.

The analog signals output by the scanner 10 are amplified by an amplifier 12 to the required input signal level and are then converted to specified digital signals by an A/D converter 14. In this embodiment, in the signals thus subjected to A/D conversion a thick black bar is converted to a digital "3", a thick white bar to a digital "1", a thin black bar to a digital "2" and a thin white bar to a digital "0", as shown in FIG. 2. These four signals can be combined to form the required ID data. The bar code ID may be of course be formed using other combinations of digital signals, as desired.

The digital signals thus converted are sent via an interface 16 to a microcomputer 18 to undergo the complete data assembly processing according to the present invention.

The microcomputer 18 includes a CPU 20 and a ROM memory 22 in which is stored a program, and executes the complete data assembly processing program of this invention.

The microcomputer 18 is provided with four types of memory, which are a current memory 24, a master memory 26, a transaction memory 28 and a decode memory 30.

Complete data obtained by the completion of the complete data assembly processing described below or by the first sweep by the scanner is supplied from the decode memory 30 to an external destination, as required. In this embodiment the CPU 20 outputs the complete data via the interface 16 to a printer 32 where it is printed out in a desired form.

It is to be understood that the bar code data is decoded by a decoder to enable it to be printed out. Although details of this are not illustrated, the microcomputer 18 is provided with a known decoder whereby the bar code 102 is decoded for outputting to the printer 32.

The bar code reader shown in FIG. 1 performs the reading automatically, by means of the scanner 10. The scanner 10 is automatically swept across the bar code a multiplicity of times until complete data is obtained. In the drawing numerals 201 to 205 indicate these scanning lines.

Figure 3:
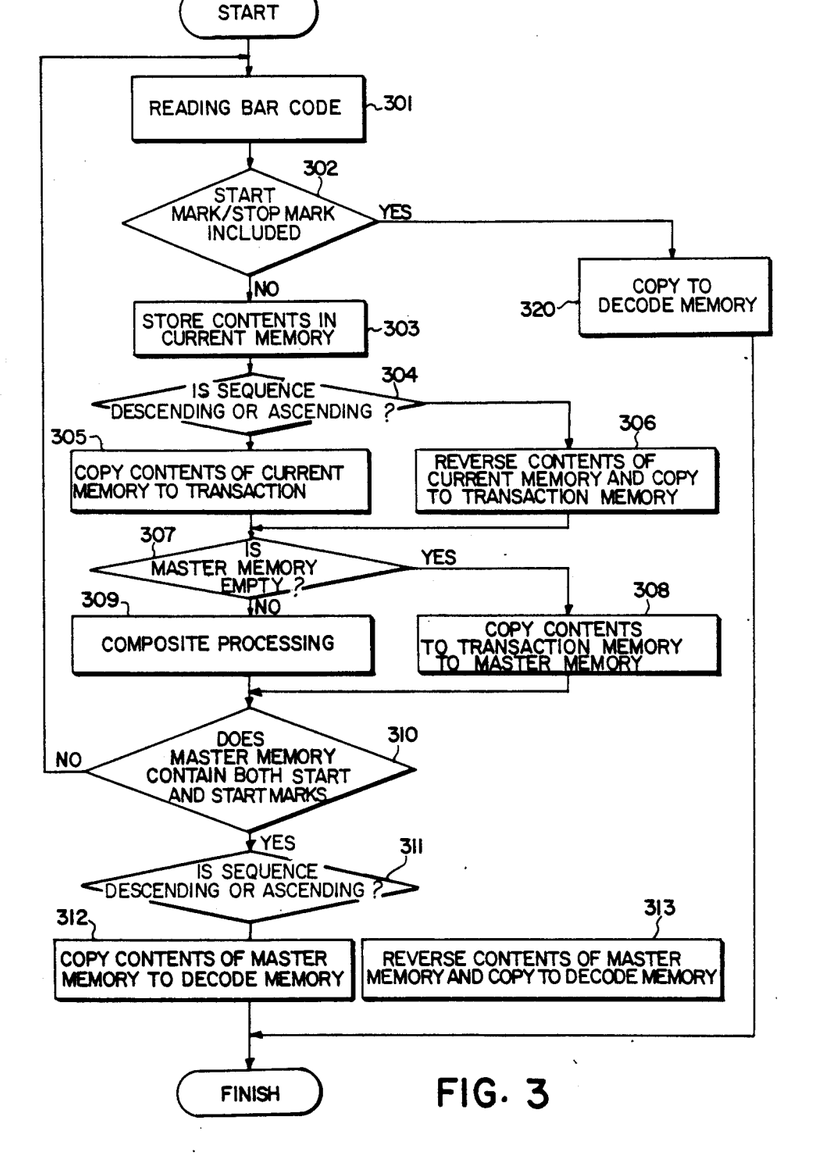
FIG. 3 is a flow chart showing a preferred embodiment of the bar code reading method of the invention.

The flow chart of FIG. 3 shows each of the processes of the bar code reading method for correcting incomplete data according to the present invention.

In step 301 it is indicated that the bar code is being read by the scanner 10. As mentioned above, the scanner 10 reads the bar code as combinations of four types of signal. In step 302 it is determined whether the data read in a single sweep by the scanner is complete data or incomplete data. In this embodiment complete data is determined as being data read in a single sweep that includes both a start mark and a stop mark.

If the data is complete data, that is, when the read data contains a start mark and a stop mark, in step 320 this read data is stored in the decode memory 30. After the contents of the decode memory 30 are read out as required by the CPU and subjected to prescribed decoding the contents are printed or sent on for post-processing.

When in step 302 the data is determined as being incomplete, in step 303 the read data is stored once in the current memory 24.

The read data thus stored in the current memory 24 is subjected to the superimposition composite processing that characterizes the present invention whereby the data from multiple individual read scans is reassembled. In this embodiment, first, in step 304 it is determined whether the data sequence is ascending or descending. Here, a descending sequence refers to incomplete data wherein a trailing part is missing so the data contains only a start mark. With reference to the bar code of FIG. 1 having a slope h, data obtained in scanning lines 201, 202 and 203 forms incomplete data with a descending sequence.

In scanning lines 204 and 205 the data thus read includes only a stop mark, and therefore forms incomplete data wherein a leading part is missing, which is referred to as incomplete data with an ascending sequence.

In this embodiment, composition of incomplete data by superimposition is performed in a direction starting from the head of the scanning, so that in the case of incomplete descending data superimposition composite processing takes place in the direction of the scanning as shown by the arrow. In the case of incomplete ascending data, preferably the data sequence is first reversed for processing. Changing the data sequence enables the same composite processing to be used for both incomplete ascending data and incomplete descending data.

In step 305, if the data is incomplete descending data the contents of the current memory 24 are transferred to the transaction memory 28. In step 306, the above sequence change process, when the data is incomplete ascending data the contents of the current memory 24 are reversed in sequence and transferred to the transaction memory 28.

After the read data that has undergone the said change in sequence has been transferred to the transaction memory 28, in step 307 it is determined whether the data is from a first scanning sweep or data from a succeeding scanning sweep. This is determined on the basis of whether the master memory 26 is empty or not. If the data is first sweep data the master memory 26 will be empty and, therefore, in step 308 the contents of the transaction memory 28 will be transferred to the master memory 26 as first sweep data.

If in step 307 the master memory is empty, the read data from a succeeding sweep and is therefore sent to the composite processing step 309. The composite processing of step 309 consists of comparison of the incomplete data stored in the master memory 26 and the data in the transaction memory 28, the superimposition of coincident portions and storage of the read data in the master memory 26 as composite data. Details of this process are described below.

When the composite processing of step 309 is completed, in step 310 it is determined whether the composite data in the master memory 26 includes both a start mark and a stop mark. When the said data includes both marks the data stored in the master memory 26 is determined as being complete data and in step 311 it is determined whether at the stage preceding the said composite processing the data sequence was descending or ascending. This determination is performed in order to reconstruct the data back to the original sequence if it is determined that the sequence of the data has been changed by preprocessing. If it is determined in step 311 that the data sequence is descending, meaning that the sequence has not been changed, in step 312 the contents of the master memory 26 are transferred to the decode memory 30, completing one scanning sequence.

If in step 311 it is determined that the data sequence is ascending, it indicates that the contents of the master memory 26 have undergone a change in sequence. Therefore, in order to return the data to the correct sequence, in step 313 the contents of the master memory 26 are again converted to reverse the sequence and transferred to the decode memory 30, completing one scanning sequence.

In the above step 310, as long as the read data in the master memory 26 is incomplete, by means of step 301 the next read scan will be repeated and the processes described above performed in sequence until the data stored in the master memory 26 is complete.

The above is to provide a general understanding of the bar code reading method of this invention; in the following the composite processing mentioned above is described in more detail.

Figure 4:
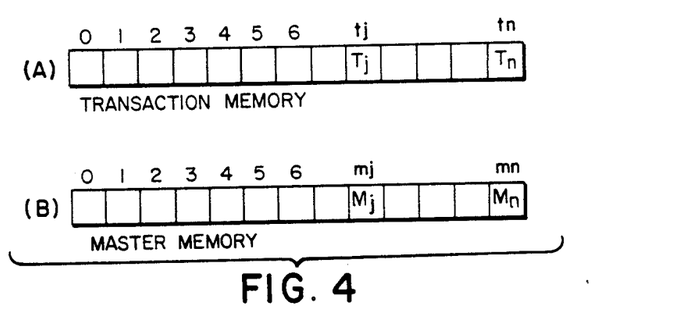
FIG. 4 is an explanatory drawing showing the contents of the master memory and transaction memory.

FIG. 4 shows an example of the contents of the transaction memory and the master memory for carrying out superimposition processing in this invention. As shown in FIG. 4(A), the contents of each transaction memory address $0 \ldots t_j \ldots t_n$ are indicated as $T_j$. Similarly, as shown in FIG. 4(B), the contents of each master memory address $0 \ldots m_j \ldots m_n$ are shown as $M_j$.

Figure 5:
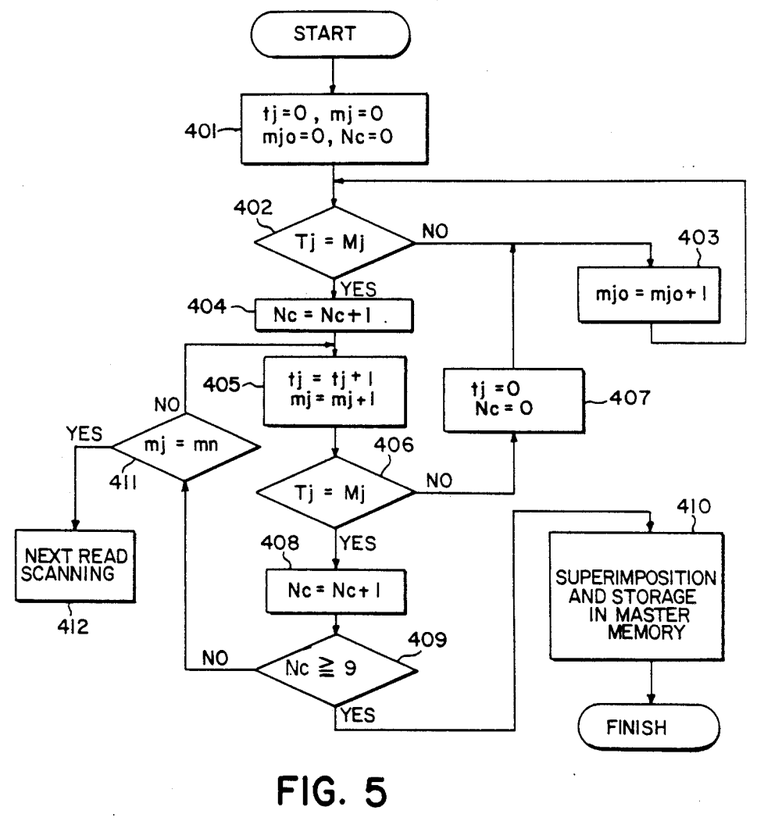
FIG. 5 is a flow chart showing the composite processing of the preferred embodiment.

FIG. 5 shows the preferred embodiment of the above composite processing, in flow chart form. The contents of the transaction memory and the master memory are sequentially compared, and when at least a specified length of the contents of the two memories coincides the said contents are superimposed to hereby combine the data.

In this embodiment the comparison process starts by the sequential comparison of the contents of the top address of the master memory with the contents of the transaction memory, and when the two are in a coincident state, next, the contents of the master memory and the transaction memory are sequentially shifted up one by one while the contents of the two memories are compared, and the point at which the contents of a specific number of address locations, nine in this embodiment, coincide is taken as the point of superimposition of the contents of the two memories, and on the basis thereof the contents of the transaction memory are superimposed on the master memory and stored therein as a composite.

In FIG. 5, composite processing is initialized in step 401 by zeroing transaction and master memory addresses $t_j$ and $m_j$, master memory increment address $m_{j0}$, and the coincident data count, as the number of coincident address locations Nc in this embodiment.

In this state, in step 402 the contents $T_j$ and $M_j$ of the two memories are compared, and when they do not coincide, in step 403 the master memory increment address $m_{j0}$ is incremented by one and the next master memory address is compared with the contents at transaction memory address 0. By repeating this the master memory is incremented until the data in the master memory coincides with the contents of the top address in the transaction memory.

If the contents of the two memories coincide in step 402, in step 404, the coincidence count is incremented by one. In step 405 the contents of both memories are incremented by one, and in that state the coincidence of the contents of the two memories is again determined. When it is determined in step 406 that the contents do not coincide, in step 407 the contents of the transaction memory are returned to the initial address and also the coincidence count Nc is returned to 0 and the original master memory address stored in step 403 returns to the state in which it has been incremented by one.

When the two coincide in step 406, the coincident count Nc is again incremented (in step 408) and in step 409 it is determined whether or not the count equals the preset count 9.

If the count coincides with the prescribed count, which is 9 in this example, it indicates that at that position the master memory and the transaction memory are in a superimposed state, and in step 410 the contents of the transaction are superimposed and stored in the master memory, completing the composite processing.

When in step 409 the coincident count is the specified count 2, it is determined in step 411 whether or not the master memory final address $m_n$ has been reached. If it is not the final address the process reverts once more to step 405 and the contents of the master memory and the transaction memory are each shifted one location at a time while repeating the comparison of the contents of the two memories.

When it is determined in step 411 that the coincident count is the same or less than the specified count, and in addition the contents of the master memory have reached the final address, it means that there are no superimposition portions so at that stage the process advances to step 412 and the next read scan is performed.

Thus, in accordance with the flow chart of FIG. 5 the contents of the master memory are used as a reference for comparison with the contents of the transaction memory, and in the state in which the two coincide for a specified count, they are superimposed to form a composite.

Figure 6:
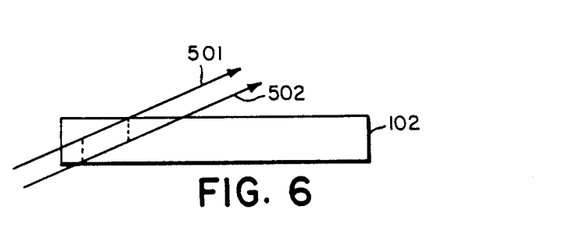
FIG. 6 is an explanatory drawing showing specifics of an example of the master memory and transaction memory shown in FIG. 5.

FIG. 6 shows when the bar code 102 is read by scanning lines at a slope thereto. Scanning line 501 shows incomplete descending data, and therefore, as is clear from the above flow chart of FIG. 3, without changing the data sequence, the succeeding data can be read in and the two compared.

The example shown in this embodiment is a two-sweep scanning procedure. In practice, this type of scanning procedure is repeated a number of times until a stop mark is stored in the master memory.

FIGS. 7 to 13 show the step by step shift of the contents of the master memory with respect to the composite processing of the example of FIG. 6 according to the flow chart of FIG. 5.

Figure 7:
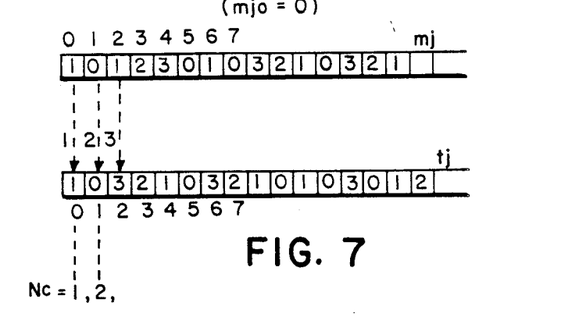
FIGS. 7 to 13 are explanatory drawings showing specific examples of each stage of the processing of the example of FIG. 6 according to the flow chart of FIG. 5.

FIG. 7, comparison is made with the master memory address at $m_{j0}=0$. Here, when the master memory address $m_{j0}$ is 1 or 2 the contents of the master memory and transaction memory $M_j$ and $T_j$ coincide but they do not coincide at address 3, and as a result the coincident count Nc stops at 2, the master memory is shifted for comparison at the next address.

Figure 8:
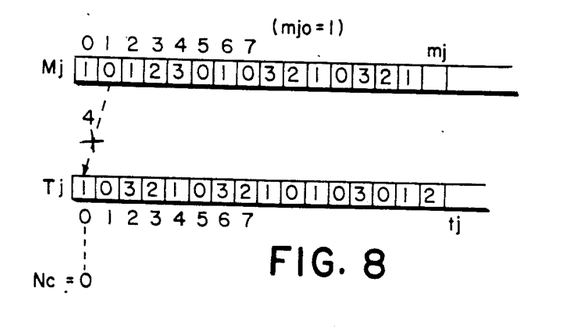

In FIG. 8 the master memory address is $m_{j0}=1$. At this point the two are already non-coincident at transaction memory address 1, so the coincident count is Nc=0 and the master memory is shifted for comparison at the next address.

Figure 9:
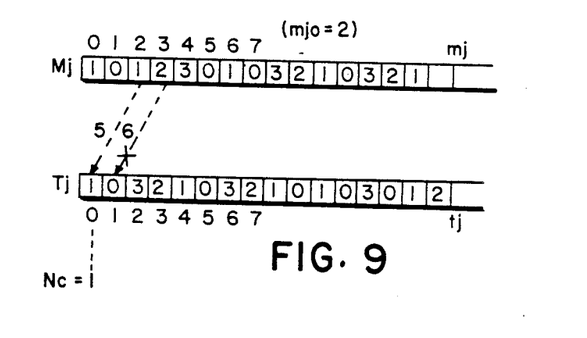

FIG. 9 shows the results of comparison at master memory address $m_{j0}=2$. It can be seen that the coincident count Nc stops at 1.

Figure 10:
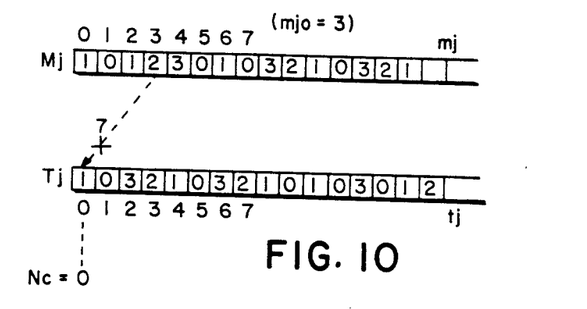
Figure 11:
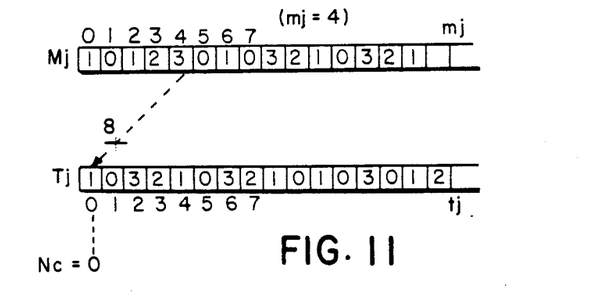

In the same way, FIGS. 9, 10 and 11 show when the memory addresses are 3, 4 and 5, respectively, with the respective coincident counts stopping at 0, 0, and 1, so composition by superimposition is not possible.

Figure 12:
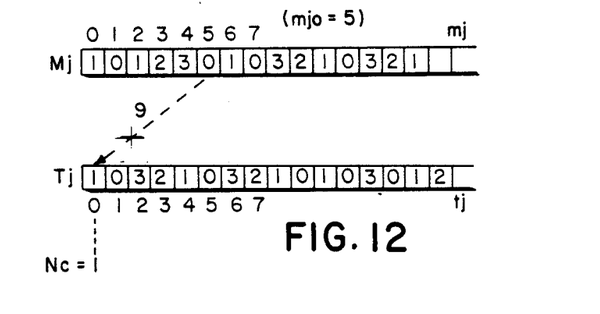
Figure 13:
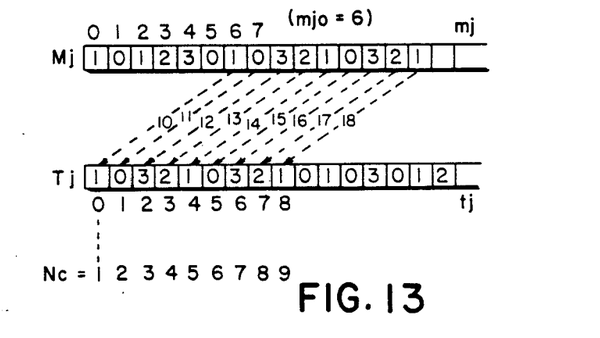

FIG. 12 shows when the memory address $m_{j0}$ is 6. As shown, a comparison of locations 10 to 18 provides a full coincident count complement of 9, so that in this state master memory address 6 and transaction memory address 0 can be successfully superimposed, and the data thus stored in the master memory as composite data.

Thus, in accordance with this embodiment, by using the contents of the master memory as a reference, storing the data read in succeeding scans in the transaction memory and comparing the contents of the two memories, the coincident portions of incomplete data for superimposition can be speedily found and the read data combined by the said superimposition.

Therefore, in accordance with the present invention, even when a bar code has a slope relative to the line of the bar code read scan, a multiplicity of incomplete data reads can be assembled automatically into complete data form, and as such the invention is well suited for automated bar code readers.

The invention has been described in detail with particular reference to certain preferred embodiments thereof, but it will be understood that variations and modifications can be effected within the spirit and scope of the invention.

What is claimed is:

1. A method of bar code reading in which a scanner sequentially scans and reads data from a bar code, comprising the steps of:
    (a) storing incomplete data from a scan that includes either a start mark or a stop mark in a master memory;
    (b) storing data read in succeeding scans in a transaction memory;
    (c) comparing incomplete data stored in the master memory and read data stored in the transaction memory, superimposing coincident parts thereof and storing such coincident parts in the master memory as composite data; and
    (d) repeating steps a-c until the composite data includes a start mark and a stop mark.

2. The bar code reading method of claim 1 wherein when a stop mark is read in step (a) including the further step of reversing ascending data supplied to the master memory and transaction memory.

* * * * *